United States Patent
Gally et al.

(10) Patent No.: US 7,884,989 B2
(45) Date of Patent: Feb. 8, 2011

(54) WHITE INTERFEROMETRIC MODULATORS AND METHODS FOR FORMING THE SAME

(75) Inventors: Brian J. Gally, Los Gatos, CA (US); William J. Cummings, Millbrae, CA (US); Ming-Hau Tung, San Francisco, CA (US); Lior Kogut, Sunnyvale, CA (US); Marc Mignard, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 887 days.

(21) Appl. No.: 11/698,521

(22) Filed: Jan. 25, 2007

(65) Prior Publication Data

US 2007/0121118 A1 May 31, 2007

Related U.S. Application Data

(63) Continuation-in-part of application No. 11/140,560, filed on May 27, 2005.

(51) Int. Cl.
*G02B 26/00* (2006.01)

(52) U.S. Cl. ............. 359/224; 359/290; 359/291; 359/292; 359/295; 359/298; 359/318; 345/85; 345/108

(58) Field of Classification Search ........... 359/223, 359/224, 290–292, 295, 298, 318; 345/85, 345/108
See application file for complete search history.

(56) References Cited

U.S. PATENT DOCUMENTS

| | | |
|---|---|---|
| 3,247,392 A | 4/1966 | Thelen |
| 3,728,030 A | 4/1973 | Hawes |
| 3,886,310 A | 5/1975 | Guldberg |
| 3,955,190 A | 5/1976 | Teraishi |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,498,953 A | 2/1985 | Cook et al. |
| 4,560,435 A | 12/1985 | Brown et al. |
| 4,655,554 A | 4/1987 | Armitage |
| 4,786,128 A | 11/1988 | Birnbach |
| 4,859,060 A | 8/1989 | Katagiri et al. |
| 4,925,259 A | 5/1990 | Emmett |

(Continued)

FOREIGN PATENT DOCUMENTS

EP 0 668 490 8/1995

(Continued)

OTHER PUBLICATIONS

Pape et al., Characteristics of the deformable mirror device for optical information processing, Optical Engineering, 22(6):676-681, Nov.-Dec. 1983.

(Continued)

*Primary Examiner*—Evelyn A. Lester
(74) *Attorney, Agent, or Firm*—Knobbe Martens Olson & Bear

(57) ABSTRACT

An iterferometric modulator array is configured to reflect a broad band spectrum of optical wavelengths by arranging a reflector and a partially transparent substrate in a non-parallel relationship.

39 Claims, 17 Drawing Sheets

U.S. PATENT DOCUMENTS

| | | |
|---|---|---|
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zahowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,559,358 A | 9/1996 | Burns et al. |
| 5,561,523 A | 10/1996 | Blomberg et al. |
| 5,636,052 A | 6/1997 | Arney et al. |
| 5,646,729 A | 7/1997 | Koskinen et al. |
| 5,646,768 A | 7/1997 | Kaeiyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goossen |
| 5,719,068 A | 2/1998 | Suzawa et al. |
| 5,734,177 A | 3/1998 | Sakamoto |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 5,914,804 A | 6/1999 | Goossen |
| 5,920,418 A | 7/1999 | Shiono et al. |
| 5,961,848 A | 10/1999 | Jacquet et al. |
| 6,028,689 A | 2/2000 | Michalicek et al. |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,242,932 B1 | 6/2001 | Hembree |
| 6,262,697 B1 | 7/2001 | Stephenson |
| 6,327,071 B1 | 12/2001 | Kimura |
| 6,335,235 B1 | 1/2002 | Bhekta et al. |
| 6,356,378 B1 | 3/2002 | Huibers |
| 6,377,233 B2 | 4/2002 | Colgan et al. |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,794,119 B2 | 9/2004 | Miles |
| 6,813,059 B2 | 11/2004 | Hunter et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,061,678 B1 | 6/2006 | Chikazawa |
| 7,123,216 B1 | 10/2006 | Miles |
| 7,130,104 B2 | 10/2006 | Cummings |
| 7,184,202 B2 | 2/2007 | Miles et al. |
| 7,236,284 B2 | 6/2007 | Miles |
| 7,245,285 B2 | 7/2007 | Yeh et al. |
| 7,372,613 B2 | 5/2008 | Chui et al. |
| 7,372,619 B2 | 5/2008 | Miles |
| 7,385,762 B2 | 6/2008 | Cummings |
| 7,459,402 B2 | 12/2008 | Doan et al. |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0015215 A1 | 2/2002 | Miles |
| 2002/0024711 A1 | 2/2002 | Miles |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kudrle et al. |
| 2002/0149828 A1 | 10/2002 | Miles et al. |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0112507 A1 | 6/2003 | Divelbiss et al. |
| 2003/0119221 A1 | 6/2003 | Cunningham et al. |
| 2003/0123125 A1* | 7/2003 | Little .................... 359/290 |
| 2003/0138669 A1 | 7/2003 | Kojima et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0207897 A1 | 10/2004 | Lin |
| 2004/0209192 A1 | 10/2004 | Lin et al. |
| 2004/0209195 A1 | 10/2004 | Lin |
| 2004/0217919 A1 | 11/2004 | Pichl et al. |
| 2004/0218251 A1 | 11/2004 | Piehl et al. |

| | | |
|---|---|---|
| 2004/0240032 A1 | 12/2004 | Miles |
| 2004/0263944 A1 | 12/2004 | Miles et al. |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068605 A1 | 3/2005 | Tsai |
| 2005/0068606 A1 | 3/2005 | Tsai |
| 2005/0068627 A1 | 3/2005 | Nakamura et al. |
| 2005/0078348 A1 | 4/2005 | Lin |
| 2005/0157364 A1 | 7/2005 | Lin |
| 2005/0168849 A1 | 8/2005 | Lin |
| 2005/0179378 A1 | 8/2005 | Oooka et al. |
| 2005/0195462 A1 | 9/2005 | Lin |
| 2005/0195467 A1 | 9/2005 | Kothari et al. |
| 2005/0202649 A1 | 9/2005 | Hung et al. |
| 2005/0249966 A1 | 11/2005 | Tung et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066935 A1 | 3/2006 | Cummings et al. |
| 2006/0066936 A1 | 3/2006 | Chui et al. |
| 2006/0067643 A1 | 3/2006 | Chui |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077507 A1 | 4/2006 | Chui et al. |
| 2006/0077508 A1 | 4/2006 | Chui et al. |
| 2006/0077515 A1 | 4/2006 | Cummings |
| 2006/0077516 A1 | 4/2006 | Kothari |
| 2006/0079048 A1 | 4/2006 | Sampsell |
| 2006/0082863 A1 | 4/2006 | Piehl et al. |
| 2006/0139723 A9 | 6/2006 | Miles |
| 2006/0220160 A1 | 10/2006 | Miles |
| 2006/0262126 A1 | 11/2006 | Miles |
| 2006/0262380 A1 | 11/2006 | Miles |
| 2006/0268388 A1 | 11/2006 | Miles |
| 2006/0274074 A1 | 12/2006 | Miles |
| 2007/0020948 A1 | 1/2007 | Piehl et al. |
| 2007/0040777 A1 | 2/2007 | Cummings |
| 2007/0121118 A1 | 5/2007 | Gally et al. |
| 2007/0177247 A1 | 8/2007 | Miles |
| 2007/0194630 A1 | 8/2007 | Mignard et al. |
| 2008/0013144 A1 | 1/2008 | Chui et al. |
| 2008/0013145 A1 | 1/2008 | Chui et al. |
| 2008/0013154 A1 | 1/2008 | Chui |
| 2008/0037093 A1 | 2/2008 | Miles |
| 2008/0055705 A1 | 3/2008 | Kothari |
| 2008/0055706 A1 | 3/2008 | Chui et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0247028 A1 | 10/2008 | Chui et al. |
| 2008/0297880 A1 | 12/2008 | Steckl et al. |
| 2009/0068781 A1 | 3/2009 | Tung et al. |
| 2009/0080060 A1 | 3/2009 | Sampsell et al. |
| 2009/0135465 A1 | 5/2009 | Chui |
| 2009/0201566 A1 | 8/2009 | Kothari |
| 2009/0213450 A1 | 8/2009 | Sampsell |
| 2009/0279162 A1 | 11/2009 | Chui |
| 2010/0039370 A1 | 2/2010 | Miles |

FOREIGN PATENT DOCUMENTS

| | | |
|---|---|---|
| EP | 1 122 577 | 8/2001 |
| EP | 1 227 346 | 7/2002 |
| EP | 1275997 | 1/2003 |
| EP | 1 473 581 | 11/2004 |
| JP | 5-49238 | 2/1993 |
| JP | 5-281479 | 10/1993 |
| JP | 11211999 | 8/1999 |
| JP | 2002-062490 | 2/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| WO | WO 98/14804 | 4/1998 |
| WO | WO 99/52006 A2 | 10/1999 |
| WO | WO 99/52006 A3 | 10/1999 |
| WO | WO 02/086582 | 10/2002 |
| WO | WO 03/069413 A1 | 8/2003 |
| WO | WO 03/105198 | 12/2003 |
| WO | WO 2004/026757 A2 | 4/2004 |

OTHER PUBLICATIONS

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Office Action dated Jan. 9, 2009 in U.S. Appl. No. 11/140,560.

Conner, "Hybrid Color Display Using Optical Interference Filter Array," SID Digest, pp. 577-580 (1993).

Jerman et al., "A Miniature Fabry-Perot Interferometer with a Corrugated Silicon Diaphragm Support", IEEE Electron Devices Society (1988).

Miles, Mark, W., "A New Reflective FPD Technology Using Interferometric Modulation", The Proceedings of the Society for Information Display (May 11-16, 1997).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l Conf. on Solid State Sensors and Actuators, vol. Conf. 6, Jun. 24, 1991, pp. 372-375.

Office Action dated Apr. 25, 2008 in Chinese App. No. 200510105838.8.

Official Action in Mexican App. No. 5010235, dated May 15, 2008.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

Office Action dated Jul. 9, 2009 in U.S. App. No. 11/140,560.

Office Action dated Jul. 17, 2009 in Chinese App. No. 200510105838.8.

\* cited by examiner

|  | +V$_{bias}$ | -V$_{bias}$ |
|---|---|---|
| 0 | Stable | Stable |
| +ΔV | Release | Actuate |
| −ΔV | Actuate | Release |

Column Output Signals (columns), Row Output Signals (rows)

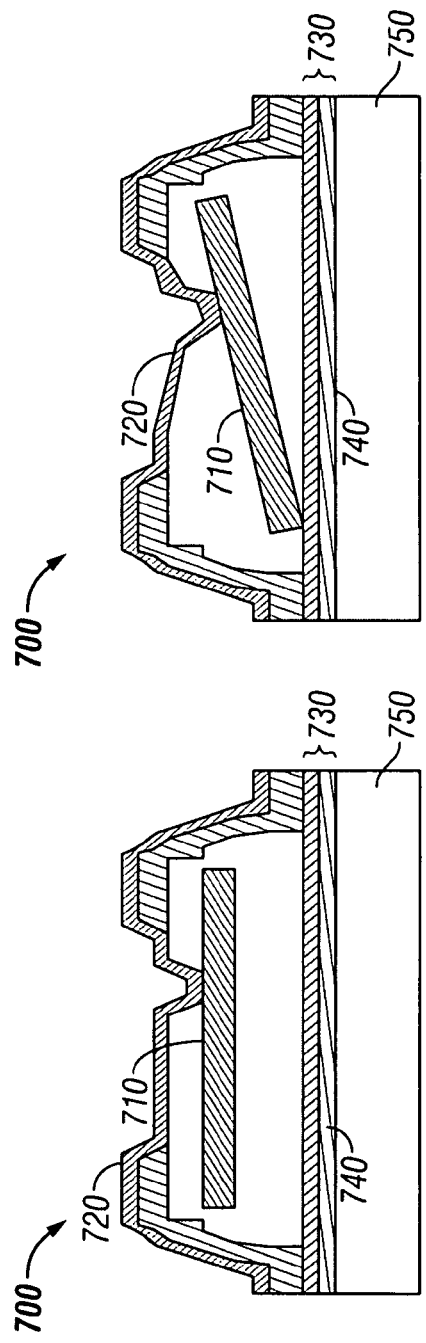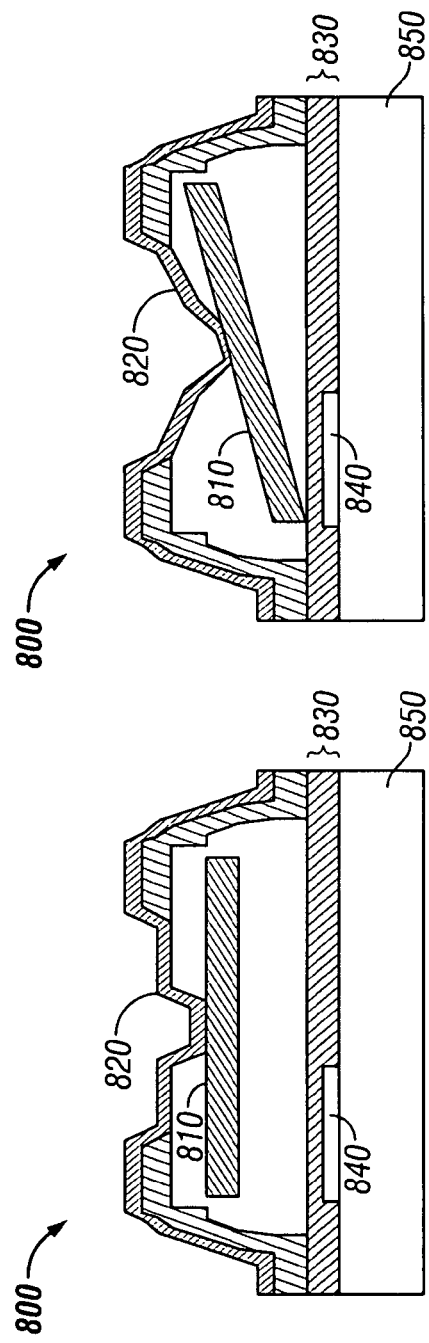

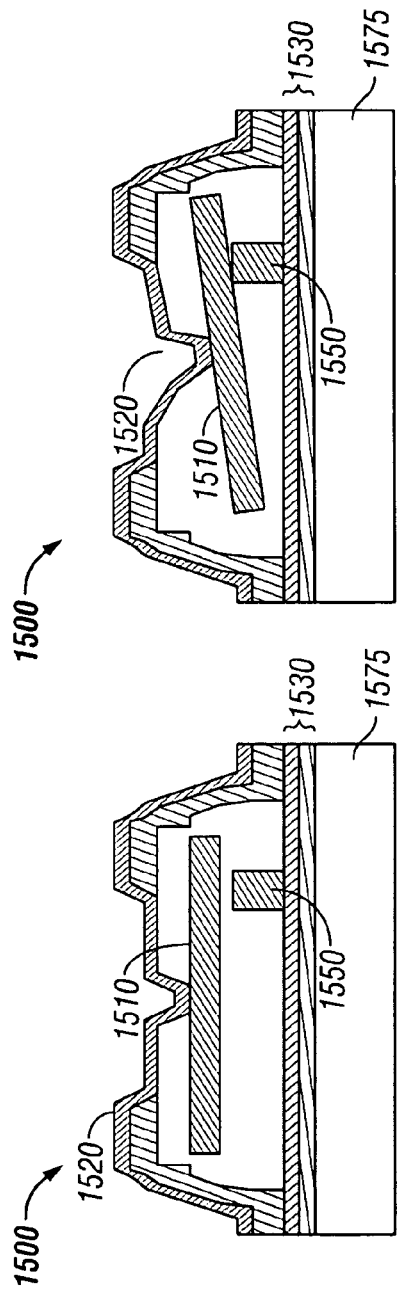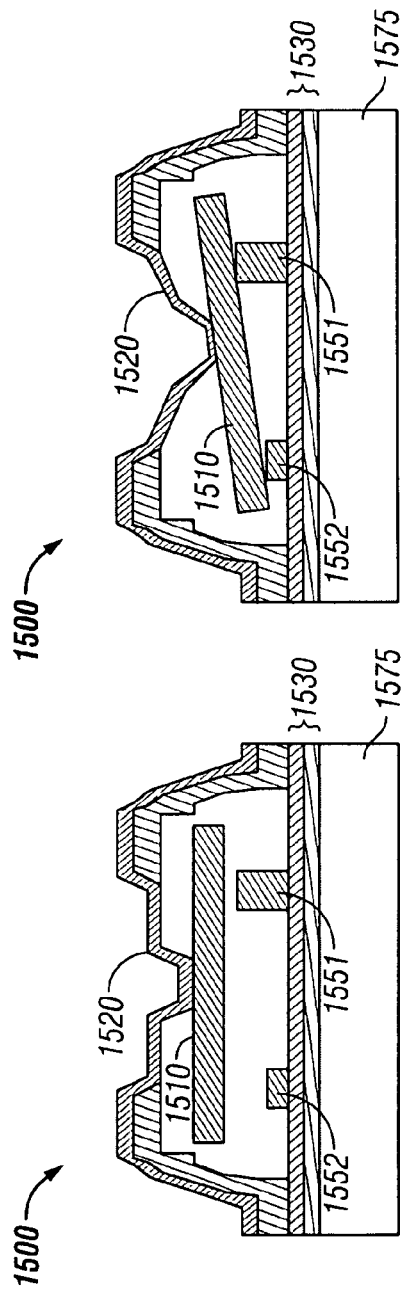

WHITE INTERFEROMETRIC MODULATORS AND METHODS FOR FORMING THE SAME

CROSS REFERENCE TO RELATED APPLICATIONS

This application is a continuation in part from U.S. application Ser. No. 11/140560, titled "System and Method for Implementation of Interferometric Modulator Displays," filed May 27, 2005, which is incorporated by reference, in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment is an optical Micro-Electro-Mechanical System (MEMS) device including a partially transparent substrate, and a reflector, where the reflector and the substrate are configured to form an optical interferometric resonance cavity therebetween and where the substrate and the reflector are non-parallel with respect to one another.

Another embodiment is a method of manufacturing an optical Micro-Electro-Mechanical System (MEMS) device, the method including providing a partially transparent substrate, an d forming a reflector, where the reflector and the substrate are configure to form an optical interferometric resonance cavity therebetween where the substrate and the reflector are non-parallel with respect to one another.

Another embodiment is a method of operating an optical Micro-Electro-Mechanical System (MEMS) device including a partially transparent substrate, and a reflector, where the reflector and the substrate are configured to form an optical interferometric resonance cavity therebetween. The method includes moving the reflector from a first position to a second position, where the substrate and the reflector are non-parallel respect to one another in at least one of the first and second positions, and providing light to the substrate.

BRIEF DESCRIPTION OF THE DRAWINGS

FIG. 7A is a side view of one embodiment of an interferometric modulator array configured such that the interferometric modulators are inclined with respect to the general plane of the substrate.

FIG. 7B is a side view of one embodiment of an interferometric modulator array configured such that only the movable layers 720/710 of the interferometric modulators are inclined with respect to the general plane of the substrate 750.

FIGS. 8A and 8B are side views of an interferometric modulator which achieves a non-parallel actuated configuration by means of an asymmetry in the applied electrostatic force.

FIGS. 15A-15D are cross-sectional views of interferometric modulators, which achieve a non-parallel configuration because of stops on the partially transparent substrate.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In one embodiment an optical Micro-Electro-Mechanical System (MEMS) device includes a partially transparent substrate, and a reflector, where the reflector and the substrate are configured to form an optical interferometric resonance cavity therebetween and where the substrate and the reflector are non-parallel with respect to one another. A result of the non-parallel configuration is that the spectrum of reflected light corresponds to the range of optical path lengths defined by the non-parallel interferometric cavity.

Figure 1:
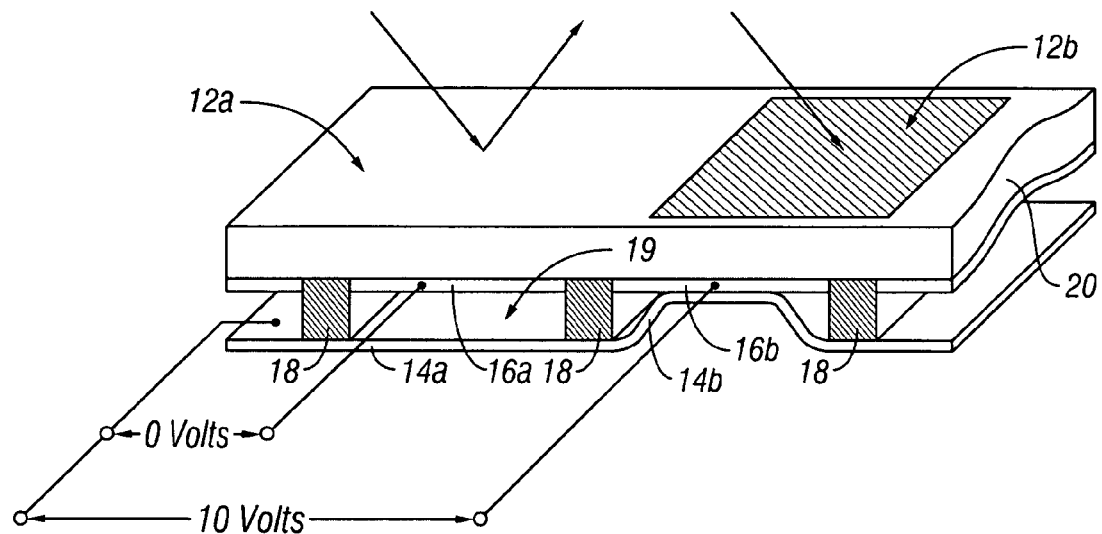
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
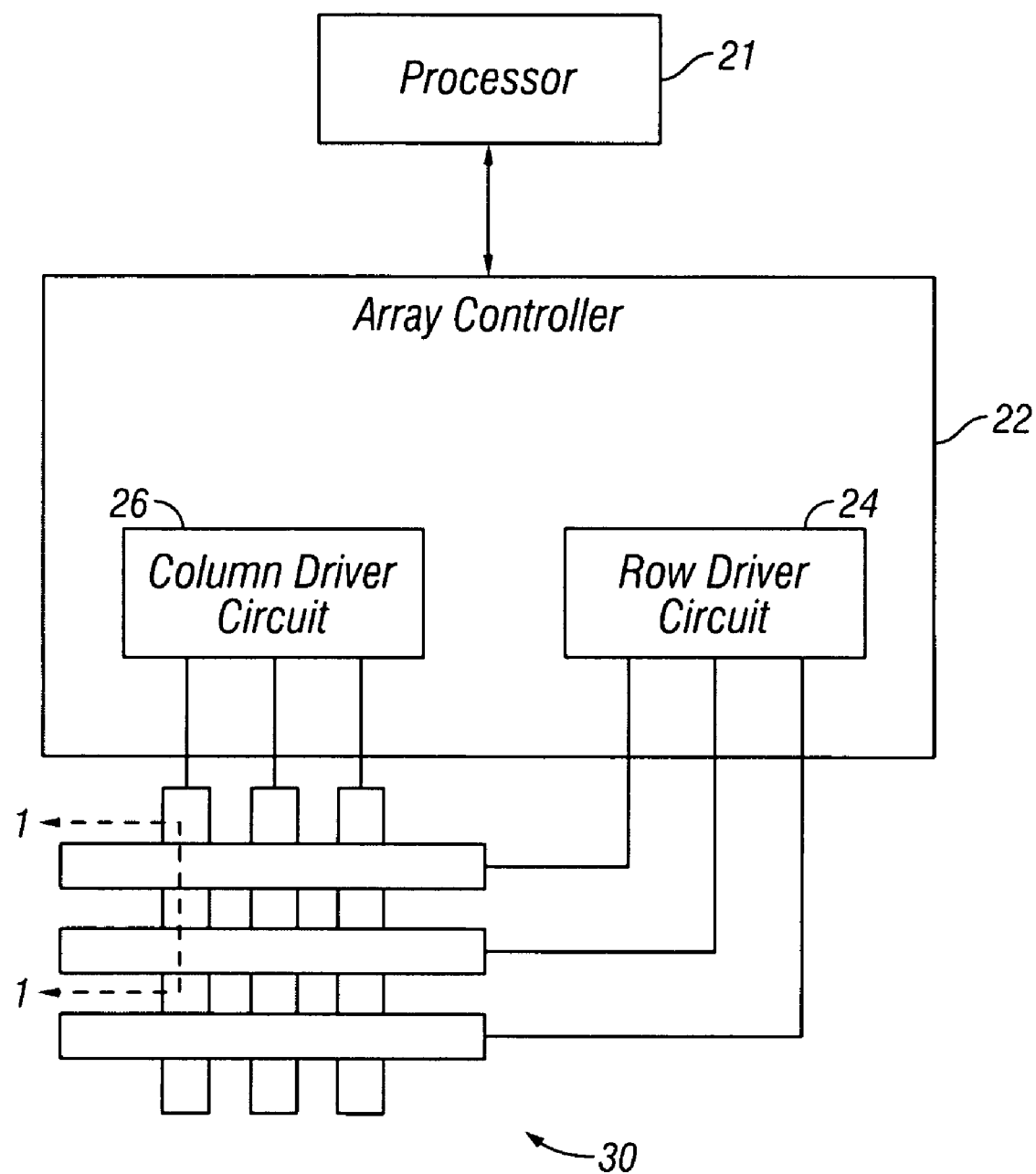
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
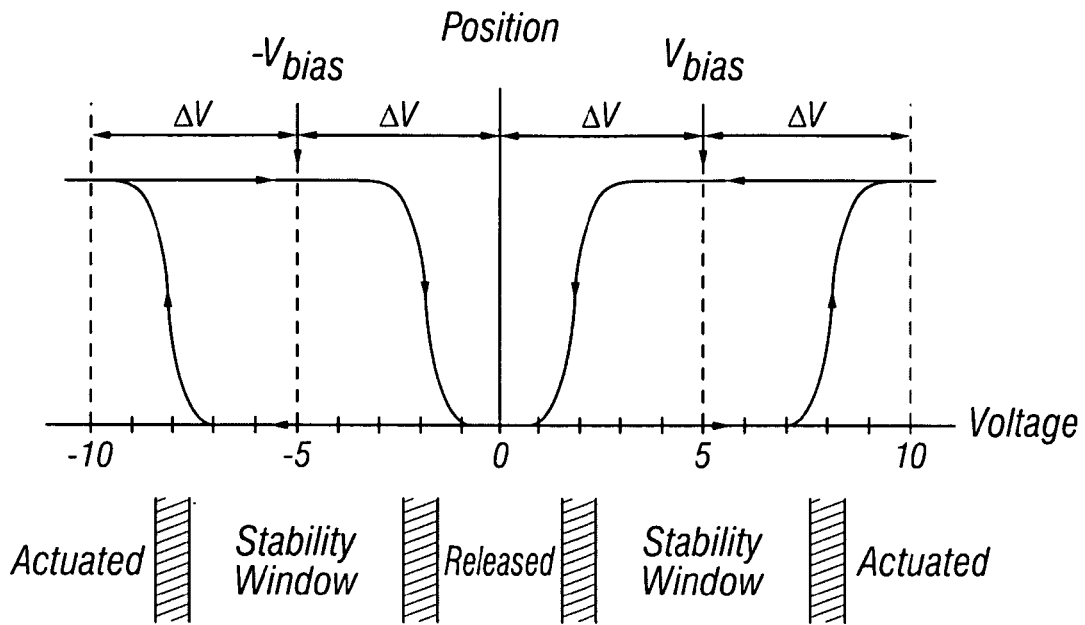
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
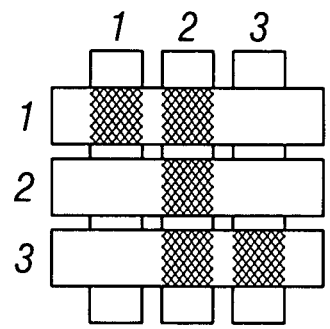
FIGS. 5A and 5B illustrate one exemplary timing diagram for row and column signals that may be used to write a frame of display data to the 3×3 interferometric modulator display of FIG. 2.
Figure 5B:
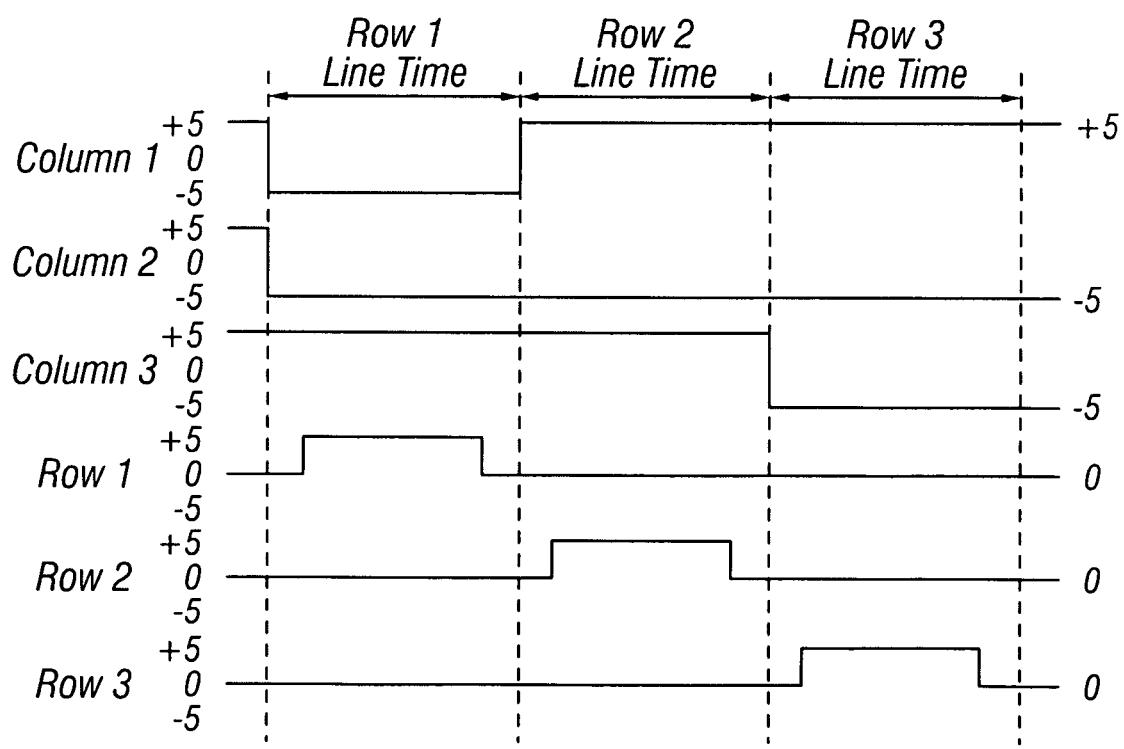

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 16A:
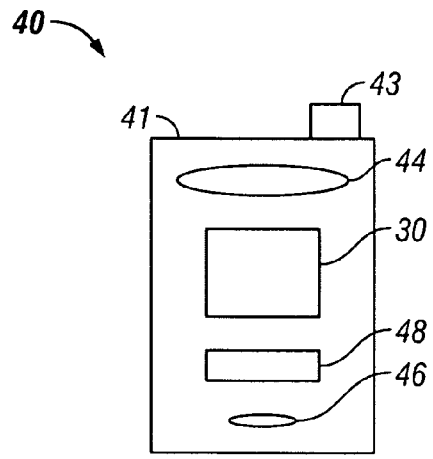
FIGS. 16A-16B are system block diagrams illustrating embodiments of a display device.
Figure 16B:
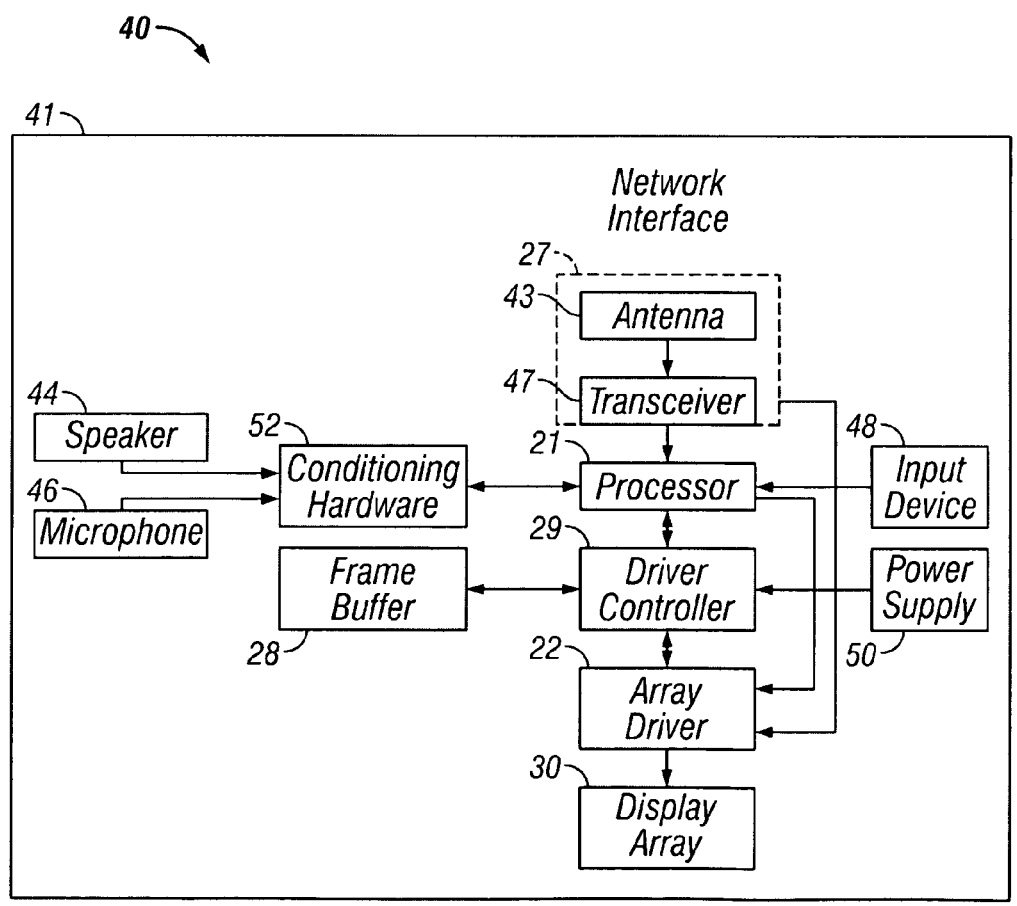

FIGS. 16A and 16B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 16B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array controller 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array controller 22. Specifically, the driver controller 29 reformats the raw image data into a data flow having a raster-like format, such that it has a time order suitable for scanning across the display array 30. Then the driver controller 29 sends the formatted information to the array controller 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array controller 22.

Typically, the array controller 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array controller 22, and display array 30 are appropriate for any of the types of displays described herein. For example, in one embodiment, driver controller 29 is a conventional display controller or a bi-stable display controller (e.g., an interferometric modulator controller). In another embodiment, array controller 22 is a conventional driver or a bi-stable display driver (e.g., an interferometric modulator display). In one embodiment, a driver controller 29 is integrated with the array controller 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array controller 22. Those of skill in the art will recognize that the above-described optimization may be implemented in any number of hardware and/or software components and in various configurations.

Figure 6A:
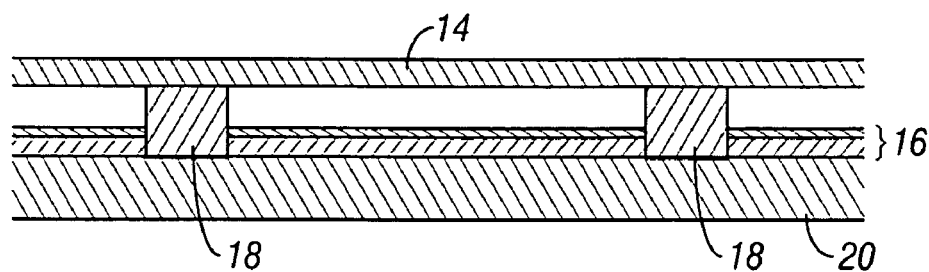
FIG. 6A is a cross section of the device of FIG. 1.
Figure 6B:
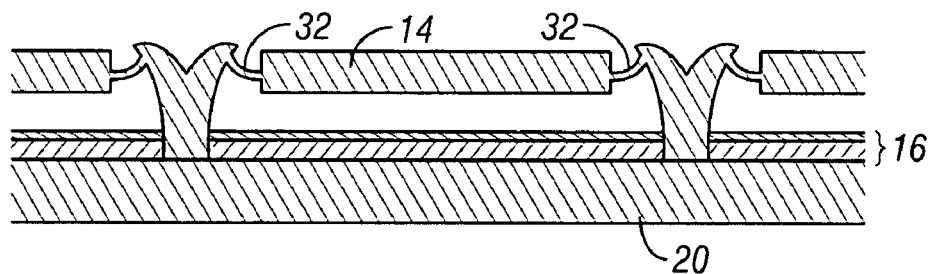
FIG. 6B is a cross section of an alternative embodiment of an interferometric modulator.
Figure 6C:
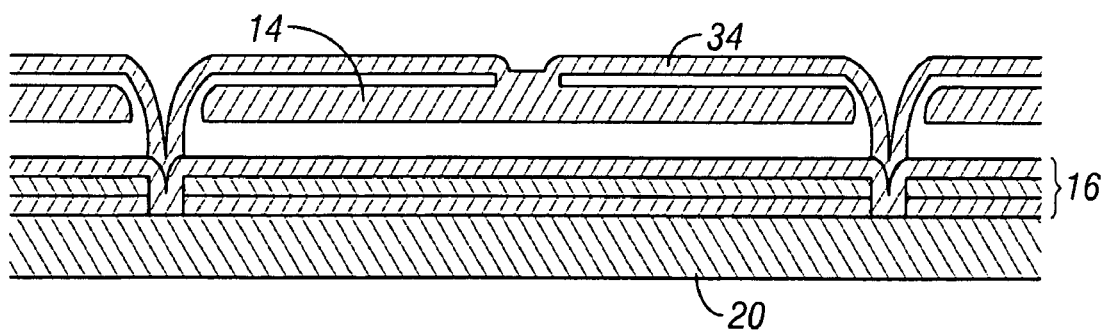
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

FIGS. 7A and 7B illustrate another embodiment of the moving mirror structure. In this embodiment interferometric modulator 700 has a mirror, reflector 710, which is connected to support structure 720 and which is above partially reflective optical stack 730. Partially reflective optical stack 730 has an electrode 740. FIG. 7A shows interferometric modulator 700 in a relaxed state and FIG. 7B shows interferometric modulator 700 in an actuated state.

Interferometric modulators such as that shown in FIGS. 7A and 7B are configured such that in at least one state of the actuated and the unactuated states, the distance between the partially transparent substrate and the reflector is not constant. In such embodiments, the optical cavity is resonant at frequencies corresponding to the substantially continuous range of optical path lengths between the partially transparent substrate and the reflector. Accordingly, the range of distances between the partially transparent substrate and the reflector defines a bandwidth for which the optical cavity is resonant. The interferometric modulator will, therefore, reflect light having a color or colors corresponding to the substantially continuous range of resonant frequencies. In some embodiments, the range of frequencies encompasses substantially the entire visible spectrum. In some embodiments, the light reflected appears white or white-like. In some embodiments, the reflector is sufficiently rigid that it substantially maintains its shape in both actuated and unactuated states.

Various embodiments of interferometric modulators have various features and configurations which result in a non-parallel arrangement of the reflector and the partially transparent substrate. The embodiments discussed herein illustrate some of these features and configurations, which include the following: asymmetric attachment of the reflector to the support structure, asymmetric application of actuation voltage, asymmetric support structure, and partially transparent substrate texture or structure. While embodiments discussed herein illustrate certain features, one skilled in the art will recognize that various combinations of features may also be practiced.

FIGS. 7A and 7B illustrate an embodiment with asymmetric attachment of the reflector 710 to the support structure 720 above partially reflective optical stack 730 and substrate 750. As shown in FIGS. 7A and 7B, reflector 710 is configured to be substantially parallel to the partially reflective optical stack 730 in the relaxed state and non-parallel with respect to the partially reflective optical stack 730 in the actuated state. In some embodiments, the reflector 710 is configured to be positioned with an angel of between about 1 degree and about 20 degrees with respect to the partially reflective optical stack 730. Angles outside of this range can also be used. In some embodiments, the reflector is stiff enough to prevent bending in the actuated (non-parallel) state upon landing on the reflector tip. Sufficient reflector stiffness may be achieved, for example, by including a layer of a stiffening material, such as $SiO_2$ to the reflector. Accordingly, the reflector substantially maintains its shape in both the actuated and unactuated states. While in the actuated state, a range of optical path lengths exist between the partially reflective optical stack 730 and the reflector 710. Accordingly, while actuated, the interferometric cavity between the partially reflective optical stack 730 and the reflector 710 is optically resonant over a range of frequencies, and is, therefore configured to reflect a broad band spectrum of colors. In some embodiments, the range of frequencies encompasses substantially the entire visible spectrum. In some embodiments, the light reflected appears white or white-like.

In some embodiments, for example interferometric modulator 700, the reflector 710 is connected to support structure 720 at a position offset from a center point on the reflector 710. When the interferometric modulator 700 is actuated by use of electrode 740 within the partially reflective optical stack 730, because the reflector 710 is connected to the support structure 720 at a position offset from center a torque force is generated. The support structure 720 is fabricated so as to allow the torque force to act on the support structure 720 such that the reflector 710 pivots substantially about a point near the connection between the reflector 710 and the support structure 720. In some embodiments, in addition to the reflector 710 pivoting, the support structure 720 also deflects during actuation.

FIGS. 8A and 8B show interferometric modulator 800 which achieves a non-parallel actuated configuration by means of an asymmetry in the applied electrostatic force. Interferometric modulator 800 has reflector 810, which is connected to support structure 820 and which is above partially reflective optical stack 830 and substrate 850. Partially reflective optical stack 830 has an electrode 840.

As shown, the electrode 840 is not aligned symmetrically with the reflector 810. Accordingly, when an actuation voltage is applied to the electrode 840, the electrostatic force is stronger on one side of the reflector 810 than on the other. Therefore, because reflector 810 has at least one electrode, reflector 810 acts as an actuation element, and the asymmetry in the electrostatic force results in the reflector 810 being in a non-parallel position with respect to the partially reflective optical stack 830.

In some embodiments, an asymmetry in electrostatic force may be generated with two electrodes within the partially reflective optical s tack 830. Each of the two electrodes may be positioned nearer one side of the reflector 810 than the other side, and each may be driven with a different voltage. The differing voltages will result in different electrostatic forces. In response to the differing electrostatic forces will pivot and tilt with respect to the partially reflective optical stack 830. In some embodiments, to minimize the attractive electrostatic force of one of the electrodes, the one electrode is driven with the same voltage as the reflector electrode. Another advantageous aspect of multiple partially reflective optical stack 830 electrodes is that differences in the voltages on the electrodes can be used to create a bending moment for the reflector 810 which may be sufficiently large to overcome MEMS stiction, a condition where an actuated MEMS member has sufficient surface forces to stick to an element with the actuation electrodes.

In some embodiments, an asymmetry in electrostatic force may be generate with one or more electrodes positioned on the reflector 810 or the support structure 820. To actuate the interferometric modulator, the electrodes are driven such that the electrostatic force on one side of the reflector 810 is stronger than on the other. Accordingly, the reflector 810 will deflect more on one side than on the other, resulting in the desired non-parallel positioning.

Figure 9A:
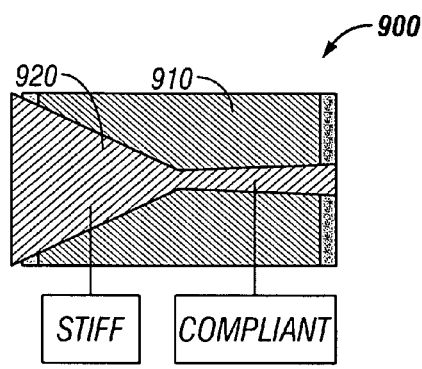
FIGS. 9A-9C are top and side views of an interferometric modulator which is configured to achieve a non-parallel actuated position because the support structure is asymmetric.
Figure 9B:
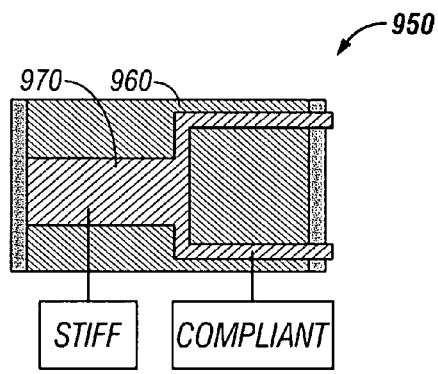

FIGS. 9A and 9B are top views of interferometric modulators 900 and 950 which are embodiments configured to achieve a non-parallel actuated position because the support structure 920 is asymmetric about a geometric center of the support structure 920. Interferometric modulator 900 has reflector 910, which is connected to support structure 920 and which is above a partially transparent substrate (not shown). Similarly, interferometric modulator 950 has reflector 960, which is connected to support structure 970 and which is above a partially transparent substrate (not shown).

Figure 9C:
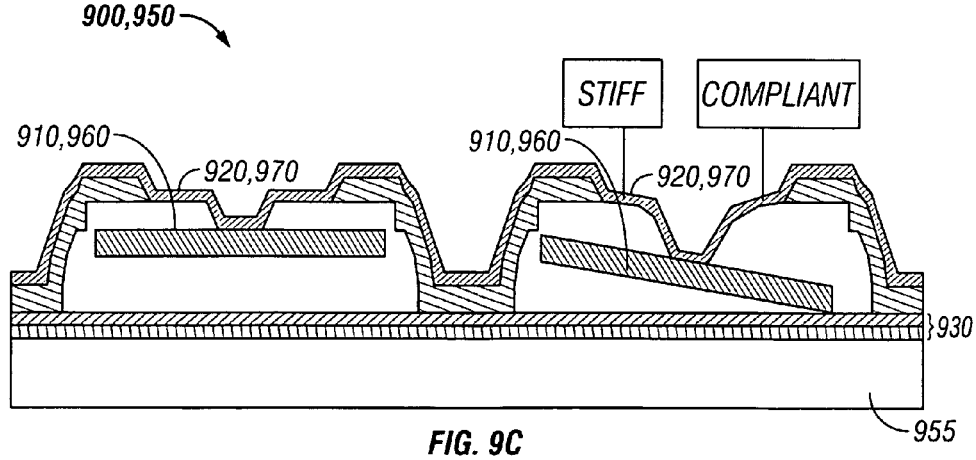

The support structures 920 and 970 are asymmetric. In the views of FIGS. 9A and 9B, the left portions of support structures 920 and 970 are stiffer than the right portions. Accordingly, when reflectors 910 and 960 are actuated, the compliant portions of the support structures 920 and 970 move more than the left portions. The actuated and unactuate configurations are shown in FIG. 9C, which is a cross-sectional view of either interferometric modulator 900 or 950 on substrate 955. As shown, when actuated, the left portion of the support structure 920 or 970 does not move as much as the right portion. Accordingly, the reflector 910 or 960 is non-parallel with the partially reflective optical stack 930 when actuated.

Figure 10A:
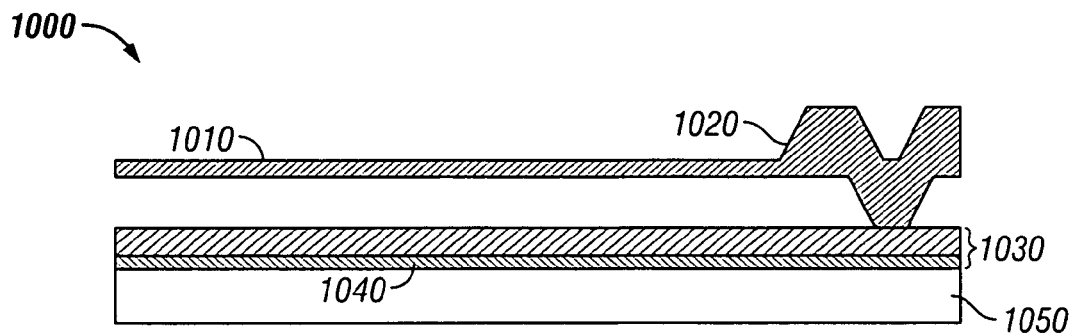
FIGS. 10A and 10B are cross-sectional views of an interferometric modulator which achieves a non-parallel actuated position because of an asymmetric attachment of the reflector to the support structure.
Figure 10B:
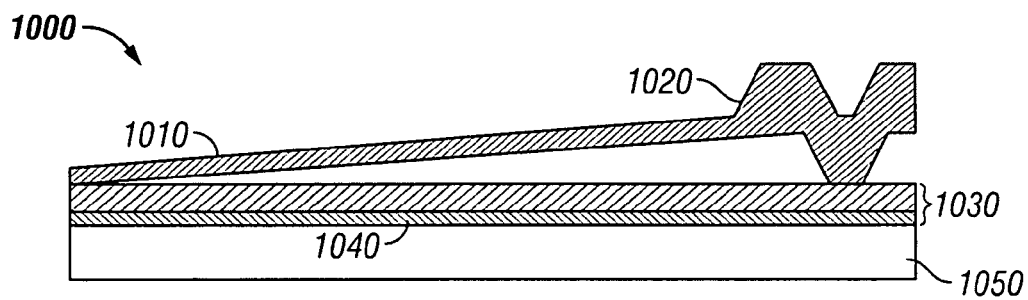

Another embodiment is shown in FIGS. 10A and 10B, which are cross-sectional views of interferometric modulator 1000. Interferometric modulator 1000 is an example of an embodiment which achieves a non-parallel actuated position because of an asymmetric attachment of the reflector to the support structure. Interferometric modulator 1000 has reflector 1010, which is connected to support structure 1020 and which is above a partially reflective optical stack 1030 over substrate 1050. Electrode 1040 is shown within partially reflective optical stack 1030. In this embodiment, reflector 1010 is connected to support structure 1020 such that reflector 1010 pivots about a point near or on the connection when an actuation voltage is applied to the electrode 1040. In some embodiments, electrode 1040 is positioned only under a portion of reflector 1010.

Figure 10C:
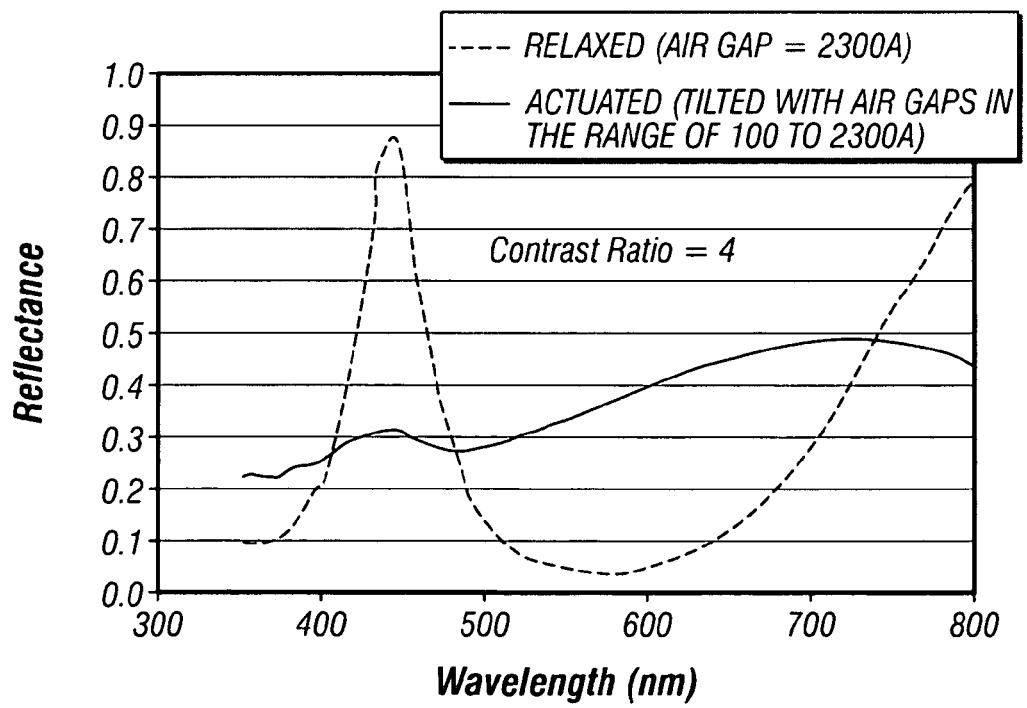
FIG. 10C shows a simulated optical spectrum of an embodiment which pivots at the edge of the reflector.

A simulated optical spectrum of an embodiment which pivots at the edge of the reflector 1010 is shown in FIG. 10C. This simulation result is based on oxide thickness of 1200 Å and air gap at the relaxed state of 2300 Å. Upon actuation, the reflector pivots tilts down to a non-parallel position where the air gap varies from 100 Å (near the contact point, due to roughness) up to 2300 Å (near the pivot point). As shown, the bandwidth of reflected light when the reflector is in the unactuated state is narrow, and corresponds to the air gap spacing, 2300 Å. In contrast, the bandwidth of reflected light when the reflector is in the actuated state is broad, and corresponds to the substantially continuous range of air gap spacing from 100 Å to 2300 Å. As indicated, the simulation results show a contrast ratio performance of about 4.

Figure 11A:
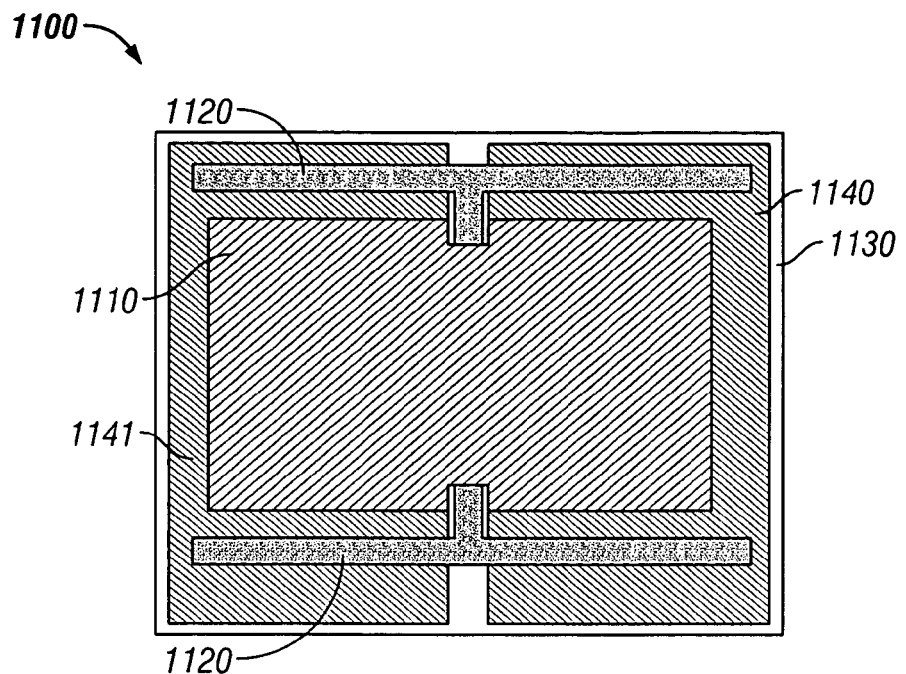
FIGS. 11A and 11B are top and perspective views, respectively, of another embodiment configured to achieve a non-parallel position through an asymmetric application of actuation voltage between an electrode and an actuation element.
Figure 11B:
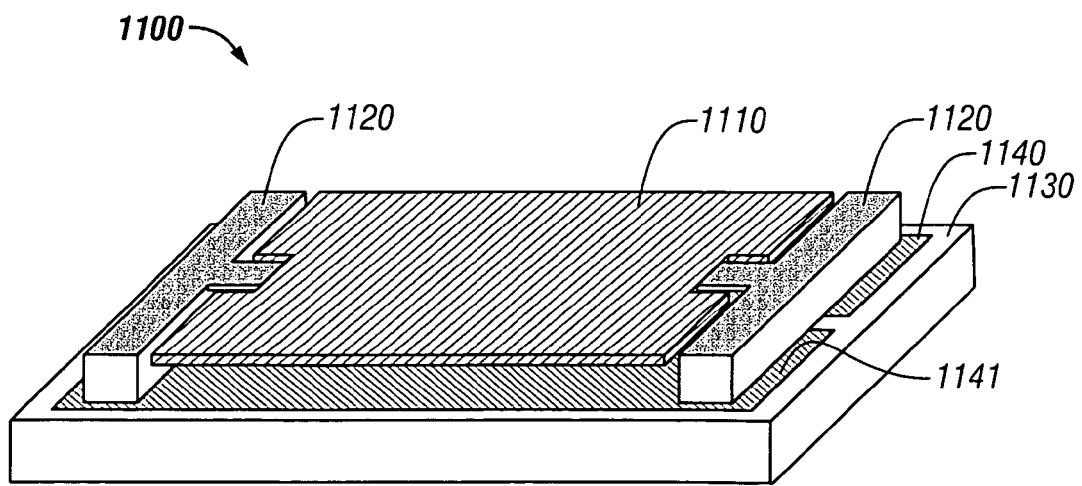

FIGS. 11A and 11B are top and perspective views, respectively, of another embodiment configured to achieve a non-parallel position through an asymmetric application of actuation voltage between an electrode 1140 or 1141 and an actuation element 1110. FIGS. 11A and 11B show interferometric modulator 1100, which has reflector 1110, which is connected to support structure 1120 and which is above electrodes 1140 and 1141 in partially reflective optical stack 1130 on substrate 1150. When an actuation voltage is applied to either electrode 1140 or electrode 1141, the reflector 1110 will experience a torsion force. The torsion force results in one side of reflector 1110 moving towards the one of electrode 1140 and electrode 1141 to which the actuation voltage was applied. Accordingly, when actuated, the reflector 1110 is non-parallel with the partially reflective optical stack 1130 above substrate 1150. Once the actuation voltage is removed, the reflector 1110 returns to a substantially parallel position because of the mechanical force of the connection between the reflector 1110 and the support structure 1120. In some embodiments, charge can accumulate, for example, in the optical stack 1130. As a result, the restorative mechanical force may be insufficient to overcome the electrostatic force attracting the reflector 1110 to the optical stack 1130. This condition is called stiction. An actuation voltage may be applied to the other electrode to overcome the stiction force since attracting the other electrode will cause the stuck portion of the reflector 1110 to rise in a see-saw like manner. In some embodiments, only one electrode 1140 or 1141 is used.

In some embodiments, an actuation voltage may be applied to both electrodes 1140 and 1141 to modify the gap between the reflector 1110 and the optical stack 1130. With this configuration the range of resonance wavelengths can be electrically modified by modifying the angle of the reflector 1110 and the gap between the reflector 1110 and the optical stack 1130. For example, in some embodiments, in a first position, the reflector is substantially a desired distance from and parallel to the optical stack 1130, such that light of a narrow bandwidth of a desired wavelength is reflected. In a second position the reflector has a desired angle and reflects substantially white light. In a third position the reflector is substantially parallel and adjacent to the optical stack, such that substantially no light is reflected.

Figure 12A:
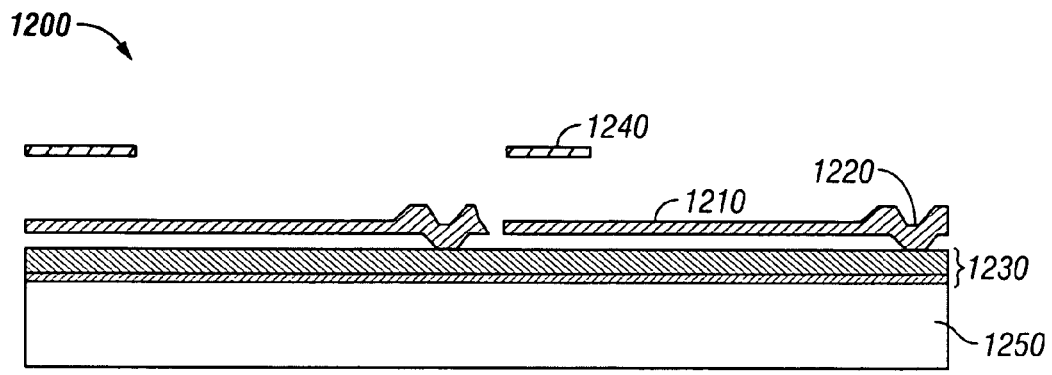
FIGS. 12A and 12B are cross-sectional views of an interferometric modulator which achieves a non-parallel configuration because of an asymmetric attachment of the reflector to the support structure.
Figure 12B:
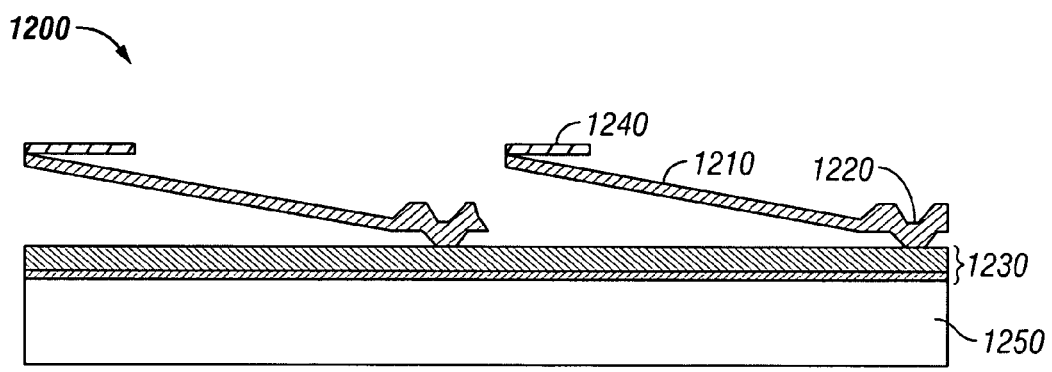

Another embodiment is shown in FIGS. 12A and 12B, which are cross-sectional views of interferometric modulator 1200. Interferometric modulator 1200 is an example of an embodiment which achieves a non-parallel configuration because of an asymmetric attachment of the reflector 1210 to the support structure 1220. Interferometric modulator 1200 has reflector 1210, which is connected to support structure 1220 and which is above a partially reflective optical stack 1230 over substrate 1250. Electrode 1240 is above part or all of reflector 1210. In this embodiment, reflector 1210 is connected to support structure 1220 such that reflector 1210 pivots about a point near or on the connection when an actuation voltage is applied to the electrode 1240. A dielectric layer (not shown) can be formed on the reflector 1210 or on electrode 1240 so as to prevent electrical contact between the reflector 1210 and the electrode 1240. Also, in some embodiments, an anti-stiction coating can be formed above the reflector. Or in another embodiment, an electrode can be formed below the reflector 1210 and used to disconnect the reflector 1210 from the electrode 1240, (e.g. dielectric 1255 of FIG. 12C has both oxide and bottom electrode layers).

Figure 12C:
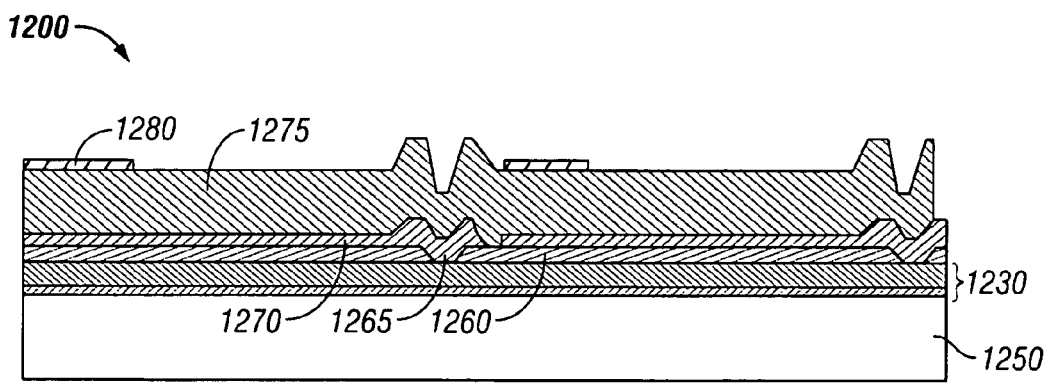
FIG. 12C is a cross-sectional view during manufacturing of an interferometric modulator similar to the interferometric modulator of FIGS. 12A and 12B.

FIG. 12C is a cross-sectional view during manufacturing of an interferometric modulator similar to interferometric modulator 1200. As shown, at this point in the manufacturing process, a partially reflective optical stack 1230 has been deposited over substrate 1250. Also, a first sacrificial layer 1260 has been deposited over the optical stack 1230, and has been etched to allow for support structure 1265 to contact the optical stack 1230. Reflector 1270 has been formed over the first sacrificial layer 1260 so as to be connected to support structure 1265. Additionally, a second sacrificial layer 1275 has been deposited over the reflector 1270 and support structure 1265, and electrode 1280 has been deposited over the second sacrificial layer 1275 and etched. During manufacturing interferometric modulator 1200 is further processed at least by removing the sacrificial layers 1260 and 1275 (As shown in FIG. 12*a*).

Figure 12D:
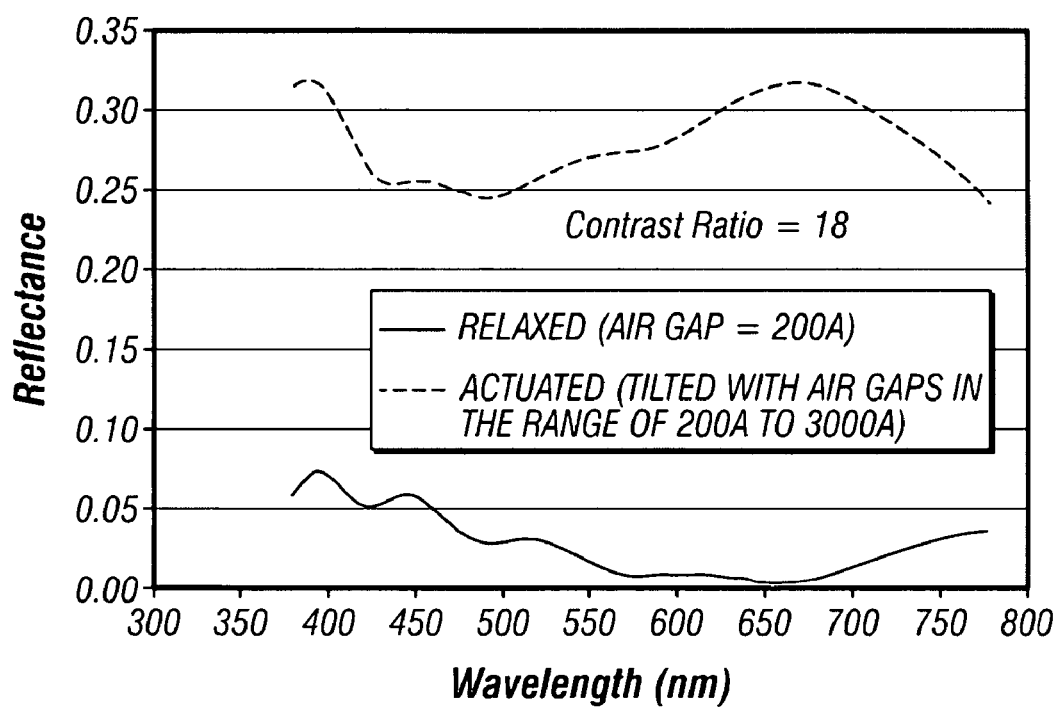
FIG. 12D shows simulated optical spectrum of an interferometric modulator similar to the interferometric modulator of FIGS. 12A and 12B.

A simulated optical spectrum of an interferometric modulator 1200 is shown in FIG. 12D. This simulation result is based on unactuated spacing between the partially reflective optical stack 1230 and the reflector 1210 of 200 Å. Upon actuation, the reflector pivots up to a non-parallel position where the air gap varies from 200 Å (near the contact point) up to 3000 Å (near the electrode 1240). As shown, the spectrum of reflected light when the reflector is in the unactuated state is broad and indicates that relatively little light is reflected. In contrast, the spectrum of reflected light when the reflector is in the actuated state is broad and indicates that the reflectance is significantly higher than when the reflector is in the unactuated state. This spectrum corresponds to the substantially continuous range of air gap spacing from 200 Å to 3000 Å. As indicated, the simulation results show a contrast ratio performance of about 25.

Figure 13A:
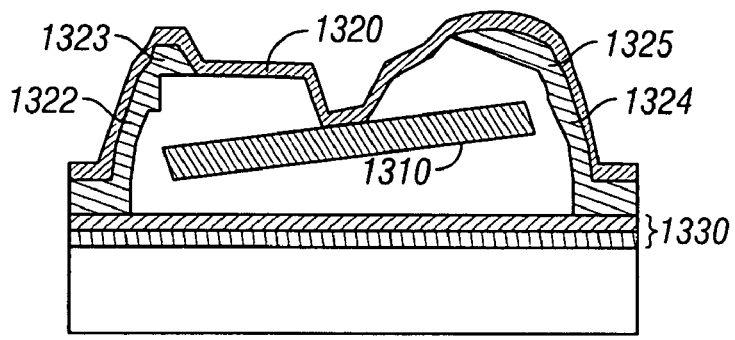
FIGS. 13A-13C are cross-sectional views of an interferometric modulator, which achieves a non-parallel configuration because of an asymmetric support structure.
Figure 13B:
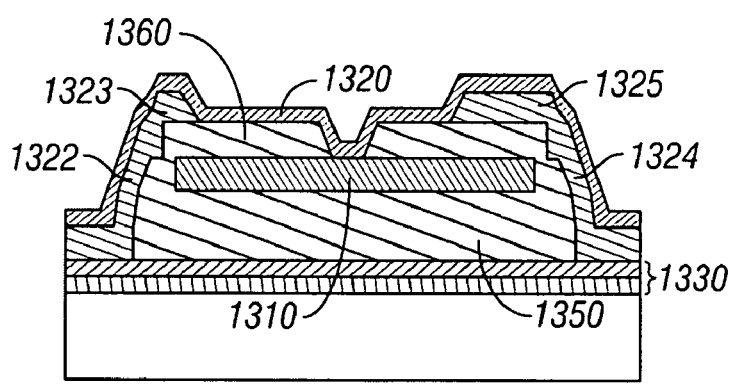

FIGS. 13A and 13B are cross-sectional views of interferometric modulator 1300, which is an example of an embodiment which achieves a non-parallel configuration because of an asymmetric support structure. Interferometric modulator 1300 has reflector 1310, which is connected to support structure 1320 and which is above a partially reflective optical stack 1330 on substrate 1350. Interferometric modulator 1300 is an embodiment in which the reflector 1310 which is non-parallel to the partially reflective optical stack 1330 when unactuated, and is substantially parallel to the partially reflective optical stack 1330 when actuated.

FIG. 13A shows interferometric modulator 1300 in the unactuated state. The reflector 1310 is non-parallel to the partially reflective optical stack 1330 when unactuated because of an asymmetry in the support structure 1320. As seen in the view of FIG. 13A support structure 1320 has post 1322 on the left which is different than post 1324 on the right. In this embodiment, the top horizontal portions of posts 1322 and 1324 have different lengths. As is discussed below, the different lengths of the horizontal portions results in the non-parallel configuration.

FIG. 13B is a cross-sectional view during manufacturing of interferometric modulator 1300. As shown, at this point in the manufacturing process, a first sacrificial layer 1350 has been deposited over a partially reflective optical stack 1330. Reflector 1310 has been formed over the first sacrificial layer 1350. A second sacrificial layer 1360 has been deposited over the reflector 1310, and has been etched to allow for support structure 1320 to contact the partially reflective optical stack 1330 and the reflector 1310. Support structure 1320 has been formed so as to contact partially reflective optical stack 1330 and the reflector 1310. Support structure 1320 has posts 1322 and 1324, which have horizontal extensions 1323 and 1325. As shown in this view, the horizontal extension 1323 of post 1322 is shorter than the horizontal extension 1325 of post 1324.

During manufacturing, interferometric modulator 1300 is further processed at least by removing the sacrificial layers 1350 and 1360. Support structure 1320 is formed such that when the sacrificial layers 1350 and 1360 are removed, posts 1322 and 1324 and horizontal extensions 1323 and 1325 experience a launch phenomenon. With the sacrificial layers 1350 and 1360 no longer holding the support structure 1320 in place, posts 1322 and 1324 and horizontal extensions 1323 and 1325 tend to release away from the partially reflective optical stack 1330. Because the horizontal extension 1325 is longer than horizontal extension 1323, the launch phenomenon causes the post 1324 to extend farther from partially reflective optical stack 1330 than post 1322 The result is that the support structure 1320 maintains the reflector 1310 non-parallel to the partially reflective optical stack 1330 while in the unactuated state.

Figure 13C:
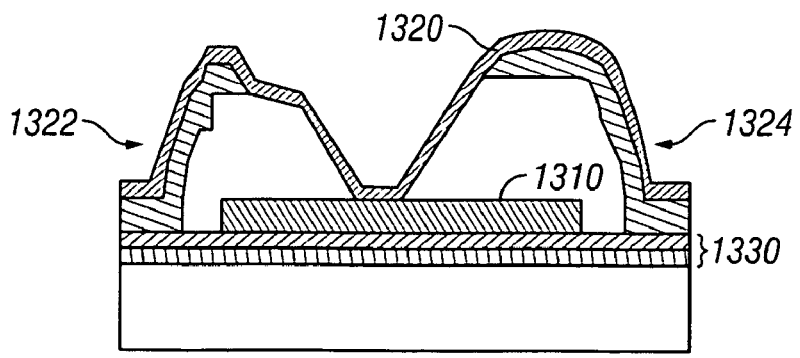

FIG. 13C shows interferometric modulator 1300 in the actuated state. When the reflector 1310 is drawn to the partially reflective optical stack 1330, because posts 1322 and 1324 are sufficiently compliant, they assume a configuration which allows the reflector 1310 to be substantially adjacent to partially reflective optical stack 1330. This is advantageous because in this configuration, there is effectively little or no interferometric cavity, and the partially reflective optical stack 1330 absorbs substantially all light of visible wavelengths. As a result, contrast ratio is improved.

Figure 13D:
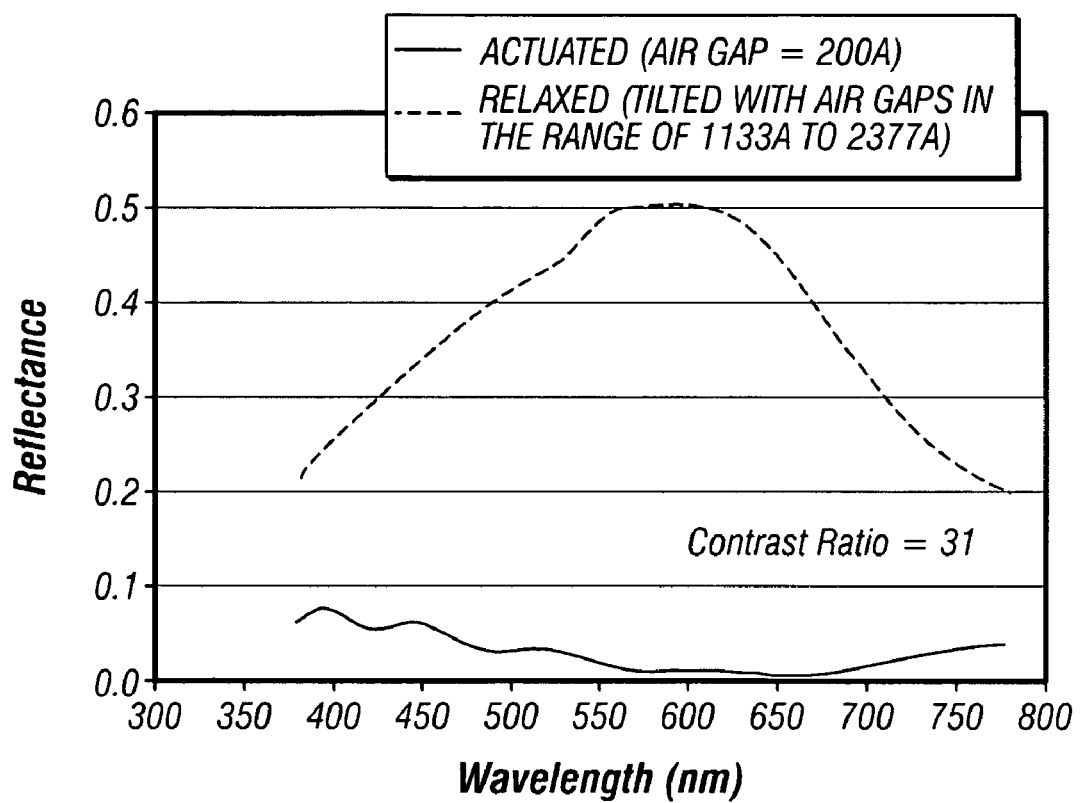
FIG. 13D shows simulated optical spectrum of an interferometric modulator similar to the interferometric modulator of FIGS. 13A-13C.

A simulated optical spectrum of an interferometric modulator 1300 is shown in FIG. 13D. This simulation result is based on unactuated non-parallel spacing between the partially reflective optical stack 1330 and the reflector 1310 being in the range from 1122 Å to 2377 Å. Upon actuation, the reflector collapses to a spacing of 200 Å (due to partially reflective optical stack 1330 roughness). As shown, the spectrum of reflected light when the reflector is in the unactuated state is broad and indicates that light is reflected across substantially the entire visible spectrum. In contrast, the spectrum of reflected light when the reflector is in the actuated state indicates that substantially all light in the visible spectrum is not reflected. As indicated, the simulation results show a contrast ratio performance of about 31.

Figure 14A:
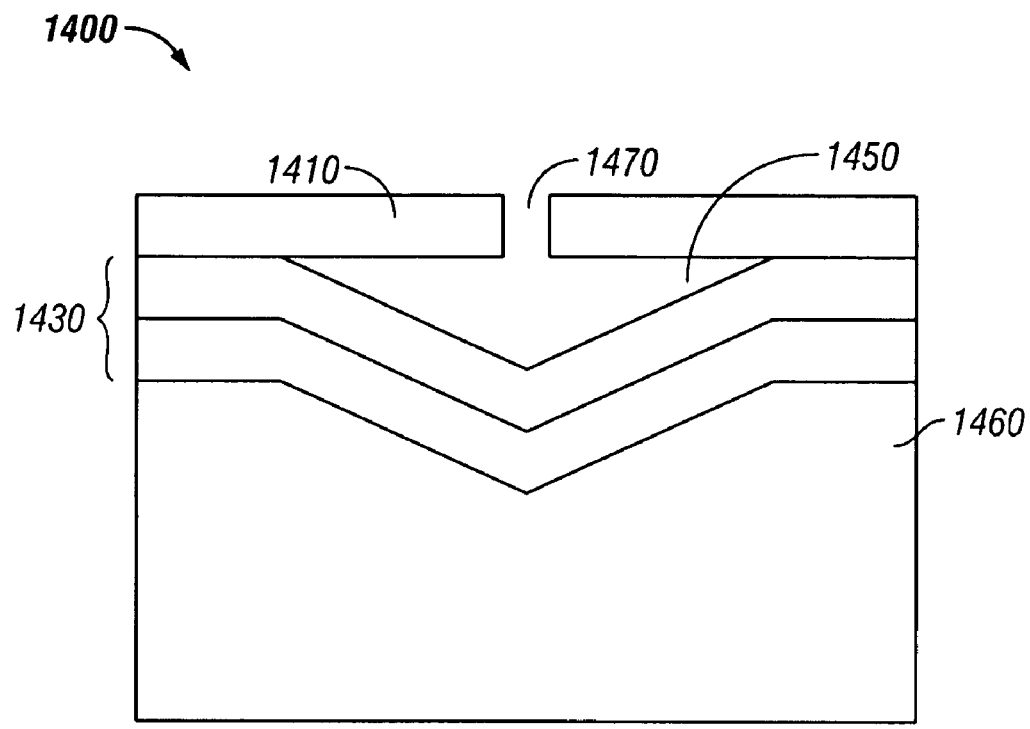
FIGS. 14A and 14B are cross-sectional views of an interferometric modulator, which achieves a non-parallel configuration because of the texture of the partially transparent substrate.
Figure 14B:
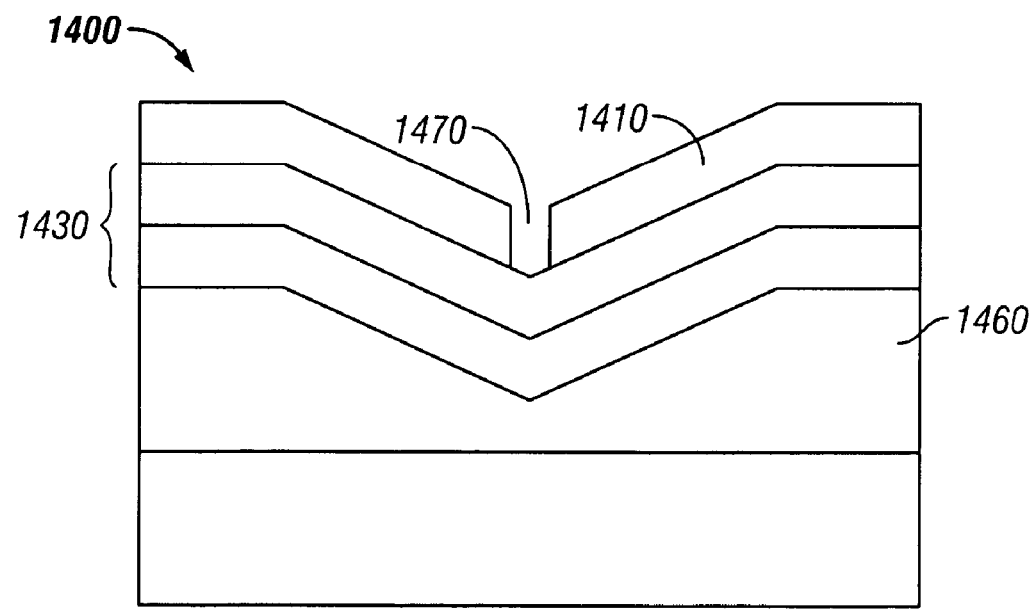

FIGS. 14A and 14B are cross-sectional views of interferometric modulator 1400, which is an example of an embodiment which achieves a non-parallel configuration because of the texture of the partially reflective optical stack 1430. Interferometric modulator 1400 has reflector 1410, which is above a partially reflective optical stack 1430 on substrate 1460. Interferometric modulator 1400 is an embodiment in which the reflector 1410 is non-parallel to the partially reflective optical stack 1430 when unactuated, and substantially parallel to the partially reflective optical stack 1430 when actuated. In this embodiment, the non-parallel configuration when unactuated is achieved because of the texture of the partially reflective optical stack 1430 and substrate 1460. In some embodiments, the texture comprises one or more cavities in the substrate 1460 or in the optical stack 1430. In some embodiments, the texture comprises one or more protrusions in the substrate 1460 or in the optical stack 1430, and in the actuated state the reflector is configured to deform according to the contour of the protrusion.

In this embodiment, a texture comprising a trench 1450 is patterned into substrate 1460 and partially reflective optical stack 1430, and reflector 1410 is formed across the top of the trench 1450, and may be anchored to the partially reflective optical stack 1430 outside the trench region. In some embodiments, the trench depth may be between 0 Å and about 3000 Å. In some embodiments, the trench width is about a few tens of microns. Accordingly, while unactuated, as shown in FIG. 14A, the reflector 1410 is parallel to a general plane of the transparent substrate 1460. The partially reflective optical stack 1430, however, is non-parallel to the general plane. Thus, the reflector 1410 is non-parallel to the partially reflective optical stack 1430 when unactuated. The trench depth and contour define the spatial characteristics of the interferometric cavity, and therefore, the wavelengths which constructively interfere. Accordingly, trench depth and contour can be modified to achieve desired reflected spectrum characteristics. In some embodiments, a hole 1470 is formed in reflector 1410 so that during actuation the fluid, which may be a liquid or a gas, of the immediate environment can flow according to the changing volume of the interferometric cavity.

In contrast, as shown in FIG. 14B, the reflector 1410 conforms to the texture of the partially reflective optical stack 1430 when actuated. The reflector 1410 being close to the partially reflective optical stack 1430 results in effectively little or no interferometric cavity, and substantially all visible light being absorbed by the partially reflective optical stack 1430. Accordingly, embodiments such as that shown in FIGS. 14A and 14B have good broad band color in the reflective state because of the distribution of optical path lengths in the interferometric cavity, and good contrast ratio because of low reflections in the dark state.

Figure 14C:
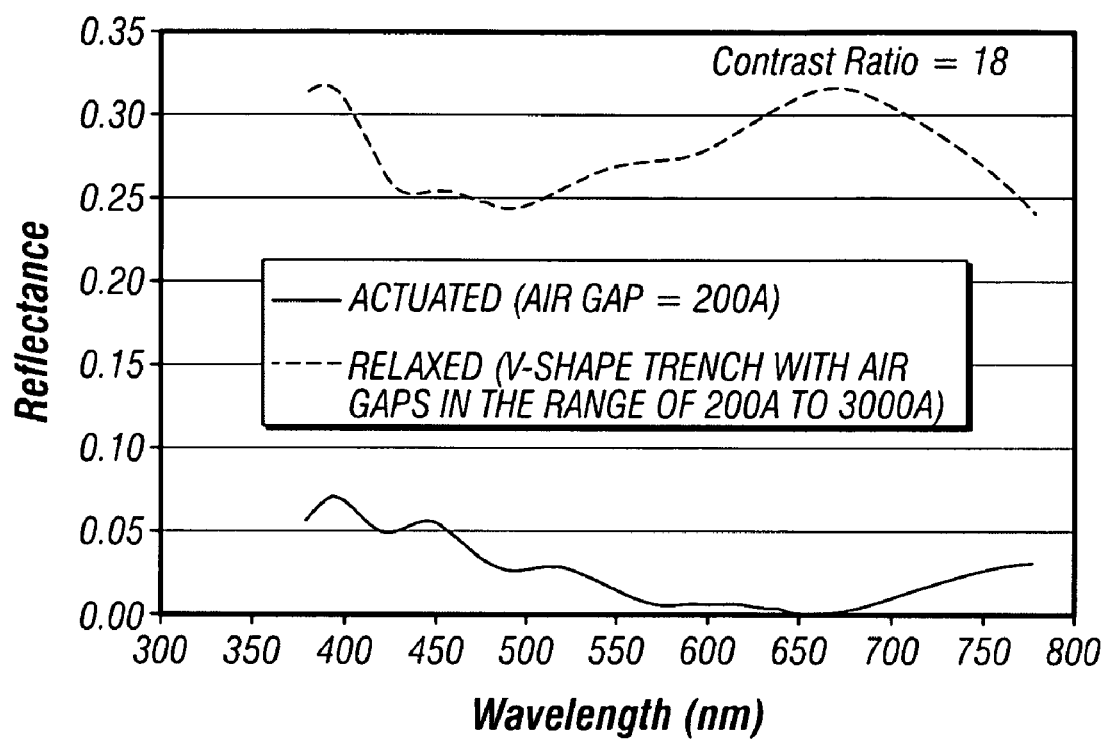
FIG. 14C shows simulated optical spectrum of an interferometric modulator similar to the interferometric modulator of FIGS. 14A and 14B.

A simulated optical spectrum of an interferometric modulator 1400 is shown in FIG. 14C. This simulation result is based on unactuated non-parallel spacing between the partially reflective optical stack 1430 and the reflector 1410 being in the range from 200 Å to 3000 Å. Upon actuation, the reflector collapses to a spacing of 200 Å (due to partially reflective optical stack 1430 roughness). As shown, the spectrum of reflected light when the reflector is in the unactuated state is broad and indicates that light is reflected across substantially the entire visible spectrum. In contrast, the spectrum of reflected light when the reflector is in the actuated state indicates that substantially all light in the visible spectrum is not reflected. As indicated, the simulation results show a contrast ratio performance of about 18.

Still another mechanism for achieving a non-parallel configuration between the reflector and the partially transparent substrate is shown in the embodiment of FIGS. 15A-15D, which are cross-sectional views of embodiments of interferometric modulator 1500. Interferometric modulator 1500 has reflector 1510, which is connected to support structure 1520 and which is above a partially transparent reflective optical stack 1530 on substrate 1575. Interferometric modulator 1500 is an embodiment in which the reflector 1510 is non-parallel to the partially reflective optical stack 1530 when actuated, and substantially parallel to the partially reflective optical stack 1530 when unactuated. In these embodiments, the non-parallel configuration when actuated is achieved because of the texture or structure of the partially reflective optical stack 1530. Interferometric modulator 1500 has one or more stops 1550 formed on partially reflective optical stack 1530. The stops limit how close each side of reflector 1510 comes to the partially reflective optical stack 1530 during actuation. The embodiments of FIGS. 15A-15D have stops formed on the partially reflective optical stack 1530. Other configurations are also possible. In some embodiments, one or more stops are formed as part of the support structure, and in some embodiments, one or more stops are formed on reflector 1510.

FIGS. 15A and 15B show an embodiment with one stop. Stop 1550 is formed on partially reflective optical stack 1530. When in the unactuated state, shown in FIG. 15A, the reflector 1510 is substantially parallel to partially reflective optical stack 1530. In contrast, when in the actuated state shown in FIG. 15B, the stop 1550 on one side prevents the reflector 1510 on that side from contacting the partially reflective optical stack 1530. Because the other side has no such stop, the other side is free to move until it contacts the partially reflective optical stack 1530. Thus, when actuated the reflector 1510 is non-parallel with the partially reflective optical stack 1530.

FIGS. 15C and 15D show an embodiment with two stops, larger stop 1551 and smaller stop 1552. Stops 1551 and 1552 are formed on partially reflective optical stack 1530. When in the unactuated state, shown in FIG. 15, the reflector 1510 is substantially parallel to partially reflective optical stack 1530. In contrast, when in the actuated state shown in FIG. 15D, the larger stop 1551 on one side prevents the reflector 1510 on that side from contacting the partially reflective optical stack 1530. Because the other side has smaller stop 1552, the other side is free to move until it contacts the smaller stop 1552. Thus, when actuated, the reflector 1510 is non-parallel with the partially reflective optical stack 1530.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An optical device comprising:
    a partially transparent substrate, wherein the substrate comprises texture and the spectrum of resonance wavelengths of the cavity is determined at least in part by the texture;
    an optical stack disposed on the partially transparent substrate; and
    a reflector, wherein the reflector and the substrate are configured to form an optical interferometric resonance cavity therebetween wherein the substrate and the reflector are non-parallel with respect to one another.

2. The device of claim 1, wherein the reflector is positioned with an angle of between about 1 degree and about 20 degrees with respect to the substrate.

3. The device of claim 1, wherein the cavity is optically resonant over a substantially continuous range of wavelengths.

4. The device of claim 1, wherein the cavity is optically resonant over substantially the entire visible spectrum.

5. The device of claim 4, wherein light reflected from the cavity and through the substrate is substantially white.

6. The device of claim 1, wherein the texture comprises at least one of a trench, a cavity, and a protrusion.

7. The device of claim 1, wherein the substrate comprises a first electrode, wherein a first gap between a first portion of the reflector and the substrate is configured to be modified by a first voltage applied across the first electrode and the reflector.

8. The device of claim 7, wherein the first electrode is positioned closer to a first peripheral edge of the reflector than to a second peripheral edge of the reflector.

9. The device of claim 7, wherein the substrate further comprises a second electrode, wherein a second gap between a second portion of the reflector and the substrate is configured to be modified by a second voltage applied across the second electrode and the reflector.

10. The device of claim 9, wherein the light reflected from the cavity and through the substrate is selectively substantially white, substantially minimized, or substantially colored, according to the magnitudes of the first and second voltages.

11. The device of claim 1, wherein the substrate comprises an electrode and the spectrum of resonance wavelengths of the cavity is determined at least in part by an application of an actuation voltage between the electrode and the reflector, and wherein the electrostatic force generated by the application of the actuation voltage is greater on a first side of the reflector than on a second side of the reflector.

12. The device of claim 11, wherein the reflector is attached to a support structure at a central portion of the reflector.

13. The device of claim 11, wherein the reflector is attached to a support structure at a peripheral portion of the reflector.

14. The device of claim 1, wherein the reflector is attached to a support structure at a position offset from a center point on the reflector, and the spectrum of resonance wavelengths of the cavity is determined at least in part by the position of the attachment.

15. The device of claim 14, wherein the support structure is configured to deform in response to forces generated by application of an actuation voltage to the device.

16. The device of claim 14, wherein the reflector is configured to pivot about a point near or on the support structure.

17. The device of claim 14, wherein the reflector is configured to deflect towards the substrate in response to forces generated by application of an actuation voltage to the device.

18. The device of claim 14, further comprising an electrode positioned such that the reflector is between the electrode and the substrate, wherein the reflector is configured to deflect away from the substrate in response to forces generated by application of an actuation voltage between the reflector and the electrode.

19. The device of claim 18, wherein a force generated by application of an actuation voltage to the device generates a greater force on a first side of the support structure than on a second side of the support structure.

20. The device of claim 18, a first side of the support structure comprises a compliant portion of the support structure and a second side of the support structure comprises a stiff portion of the support structure.

21. The device of claim 18, a first side of the support structure is farther from the substrate than a second side of the support structure.

22. The device of claim 1, wherein the reflector is attached to a support structure and the support structure comprises an asymmetry, and the spectrum of resonance wavelengths of the cavity is determined at least in part by the asymmetry of the support structure.

23. The device of claim 1, wherein the reflector is configured to move to a position such that the reflector is substantially adjacent and substantially parallel to the substrate.

24. The device of claim 1, wherein the contrast ratio of light reflected from the cavity and through the substrate with the reflector at first and second positions is at least 4.

25. The device of claim 24, wherein the light reflected from the cavity and through the substrate with the reflector at the first position is substantially white.

26. The device of claim 24, wherein light reflected from the cavity and through the substrate with the reflector at the second position of the plurality of positions is substantially colored.

27. The device of claim 1, further comprising:
a display;
a processor that is configured to communicate with the display, the processor being configured to process image data; and
a memory device that is configured to communicate with the processor.

28. The device of claim 27, further comprising a driver circuit configured to send at least one signal to the display.

29. The device of claim 28, further comprising a controller configured to send at least a portion of the image data to the driver circuit.

30. The device of claim 27, further comprising an image source module configured to send the image data to the processor.

31. The device of claim 30, wherein the image source module comprises at least one of a receiver, transceiver, and transmitter.

32. The device of claim 27, further comprising an input device configured to receive input data and to communicate the input data to the processor.

33. An optical device comprising:
a partially transparent substrate;
an optical stack disposed on the partially transparent substrate;
a reflector, wherein the reflector and the substrate are configured to form an optical interferometric resonance cavity therebetween wherein the substrate and the reflector are non-parallel with respect to one another; and
a stop configured to constrain the reflector to a predetermined position and wherein the spectrum of resonance wavelengths of the cavity is determined at least in part by the predetermined position of the reflector.

34. A method of manufacturing an optical device, the method comprising:
providing a partially transparent substrate;
providing an optical stack on the partially transparent substrate;
forming texture in the substrate, wherein the spectrum of resonance wavelengths of the cavity is determined at least in part by the texture; and
forming a reflector, wherein the reflector and the substrate are configured to form an optical interferometric resonance cavity therebetween wherein the substrate and the reflector are non-parallel with respect to one another.

35. The method of claim 34, further comprising forming a structure on the substrate, wherein the spectrum of resonance wavelengths of the cavity is determined at least in part by the structure.

36. The method of claim 34, further comprising:
forming an electrode in or on the substrate; and
forming an actuation element,
wherein the spectrum of resonance wavelengths of the cavity is determined at least in part by an asymmetric application of actuation voltage between the electrode and the actuation element.

37. The method of claim 34, further comprising:
forming a support structure; and
attaching the reflector to the support structure at a position offset from a center point on the reflector.

38. The method of claim 34, further comprising:
forming a support structure, wherein the support structure is asymmetric about a geometric center of the support structure.

39. An optical device manufactured by the method of claim 34.

* * * * *

UNITED STATES PATENT AND TRADEMARK OFFICE
CERTIFICATE OF CORRECTION

| | | |
|---|---|---|
| PATENT NO. | : 7,884,989 B2 | Page 1 of 1 |
| APPLICATION NO. | : 11/698521 | |
| DATED | : February 8, 2011 | |
| INVENTOR(S) | : Brian J. Gally et al. | |

It is certified that error appears in the above-identified patent and that said Letters Patent is hereby corrected as shown below:

Title Page (Item 57) (Abstract), Line 2, change "iterferometric" to --interferometric--.

Column 1, Line 22, change "and or" to --and/or--.

Column 1, Line 66, change "an d" to --and--.

Column 1, Line 67, change "configure" to --configured--.

Column 2, Line 10, change "respect" to --with respect--.

Column 10, Line 63, change "s tack" to --stack--.

Column 11, Line 13, change "generate" to --generated--.

Column 11, Line 35, change "unactuate" to --unactuated--.

Column 14, Line 16, change "1322" to --1322.--.

Signed and Sealed this
First Day of May, 2012

David J. Kappos
*Director of the United States Patent and Trademark Office*